June 18, 1946.                O. H. DICKE                2,402,380
                          SYNCHRONOUS MOTOR
                       Original Filed Jan. 18, 1943
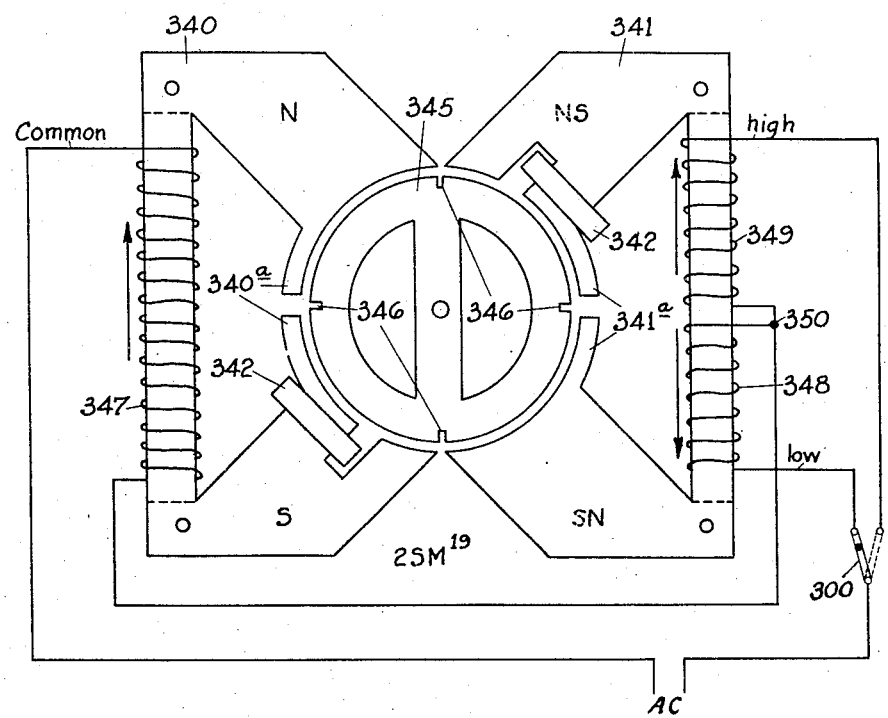
Inventor
Oscar. H. Dicke Patented June 18, 1946

2,402,380

UNITED STATES PATENT OFFICE 2,402,380

SYNCHRONOUS MOTOR

Oscar H. Dicke, Rochester, N. Y.

Application January 18, 1943, Serial No. 472,698, which is a division of application Serial No. 245,700, December 14, 1938. Divided and this application March 2, 1944, Serial No. 524,733

8 Claims. (Cl. 172—278)

The present invention relates to time control systems and more particularly to a two speed synchronous motor for such system. This is a division of my prior application, Ser. No. 472,698 filed January 18, 1943, which was a division of my prior application, Ser. No. 245,700, filed December 14, 1938, now Patent No. 2,313,466.

An object of the present invention resides in the provision of a synchronous motor including a single rotor which will operate at two synchronous speeds, the particular speed of operation depending on the particular one of two circuits that is energized.

Other objects, purposes and characteristics and their advantages will appear from the following description when taken in connection with the drawing and from the drawing itself, which shows a two speed synchronous motor which constitutes either a two pole or a four pole motor depending on which of its two circuits is energized.

In the drawing has been illustrated a two circuit two speed single stator single rotor synchronous motor 2SM[10] that may be used for clock correcting purposes or may be substituted for any one of the pairs of high speed and low speed winding motors shown in the parent application.

This two speed synchronous motor 2SM[10] comprises two generally U-shaped stator cores 340 and 341 constructed of soft iron laminations. One pole, namely, the rearward pole with respect to the direction of rotation, of each of these U-shaped cores 340 and 341 is bifurcated and provided with a shading coil 342 to cause such direction of rotation. The ends of the poles of these U-shaped cores 340 and 341 are rounded to leave a small uniform air-gap between them and the tempered steel rotor 345 and are so spaced as to constitute a four pole construction in which alternate poles are shaded for the same direction of rotation and so that the shaded portion of a shaded pole lies adjacent the other pole of the same core 340 or 341.

If now these cores are so excited from a source of alternating current that adjacent poles of different cores have like instantaneous magnetic polarities we have a typical two pole motor stator of which each pole belongs half to one core 340 and half to the other core 341 and which two poles each has a single shading coil to produce clockwise rotation of a magnetic field. This two pole magnetic field rotating in a clockwise direction produces hysteresis torque in the rotor 345 tending to drag this rotor with it. As the rotor approaches its synchronous speed of 3600 R. P. M. the rotor due to the path across it of low reluctance and including the two spokes in series, having in multiple therewith two rim portions, locks in with this magnetic field, so that the rotor operates at 3600 R. P. M., assuming a sixty cycle alternating current source.

If now the stator cores 340 and 341 are so magnetically excited from such a source of alternating current that adjacent poles of different cores have opposite instantaneous magnetic polarities we have a four pole stator of which two adjacent poles belong to one core member 340 and other two poles belong to the other core member 341. This four pole magnetized structure has alternate poles only shaded, that is, has either the north poles or the south poles shaded for clockwise rotation for a particular magnetic wave of a magnetic cycle. This four pole magnetic field will of course rotate only at a speed of 1800 R. P. M. and will tend to drag the rotor 345 with it. When the rotor 345 approaches synchronous speed it will lock in, so to speak, with this rotating magnetic field. This locking-in effect is produced by the four slots 346 cut radially into the rotor 345 from the outside and causes the rotor to operate at 1800 R. P. M.

In order to increase the amount of alternating current flowing in the shading rings 342 and correspondingly increase the lagging magnetic flux produced thereby the pole pieces are provided with extensions of magnetic material 340[a] and 341[a]. By looking at the stator structure of the drawing it will be seen that if the stator is magnetized to produce a two pole magnetic field the usual shading is afforded but that when the stator is magnetized to produce a four pole magnetic field only two of the four poles are provided with shading coils. This has been done purposely, because if the other two poles had been bifurcated and shading rings had been provided these additional shading rings would have produced harmful effects when the magnetic structure is excited to produce a two pole magnetic field, in that such additional shading rings would lie in the middle of the unshaded portion of each of the two poles.

In order to produce two pole or four pole magnetization of the core structure 340—341 the core 340 is preferably provided with a helical coil 347 and the core 341 is provided with a helical coil 348—349 having a center tap 350. This center tap is preferably connected to one terminal of the coil 347 the other terminal of this coil 347 being connected to the "common" wire in the particular system in which the motor 2SM[10] is used. Each of the coils 347, 348 and 349 preferably has the same number of turns so that the magneto-motive force from pole to pole of the two cores 340 and 341 is the same irrespective of which of the two circuits is energized. It is thus seen that if alternating current is caused to flow from the wire "low" to the wire "common," as is the case with double throw switch 300 in the left-hand position, four pole magnetization will result causing the rotor to operate at 1800 R. P. M., but if alternating current is caused to flow from the wire "high" to the wire "common," as is the case when switch 300 is in the dotted position, two pole magnetization results, the magnetic polarities for four pole magnetization and for two pole magnetization of the core 341 having been illustrated by the solid letters N and S and the dotted letters N and S, respectively. The direction of the magnetism has also been indicated by arrows. Under normal conditions the motor 2SM[19] will be energized to constitute a four pole motor, but it will be energized to constitute a two pole motor when used in a secondary clock and such secondary clock is to be advanced or if used for winding a main spring when such main spring is to be wound up at double speed.

Having thus shown and described a single embodiment of the present invention it is desired to be understood that the invention is not limited to the particular construction shown except as demanded by the scope of the following claims.

What I claim as new is:

1. A two-speed alternating current motor comprising, a hysteresis rotor, yoke portions of magnetic material each terminating in two poles cooperating with said rotor in a manner so that the first pole is cooperated with first and the second pole of the same yoke is cooperated with later upon turning of the rotor in a forward direction, said first pole only of each yoke being bifurcated, a conducting band of low resistance on the second bifurcation only of the first pole of each yoke to be encountered by said rotor when operating in the forward direction, coils associated with said yokes, and means for energizing said coils so that adjacent poles of adjacent yokes will be of unlike polarities to cause said rotor to be operated forward at normal speed or so that adjacent poles of adjacent yokes will be of like polarities to cause said rotor to be operated forward at substantially double normal speed.

2. In a two-speed motor, the combination with a plurality of yokes of magnetic material each having two poles and so located with respect to each other as to constitute radially disposed poles substantially equally spaced, means for magnetizing said yokes by alternating magnetic flux in a manner to produce magnetic poles of unlike polarity in adjacent poles in each yoke and to produce magnetic poles of either like or unlike polarity in adjacent poles of different yokes one pole only of each of said yokes being bifurcated, a shading coil on the inwardly located bifurcation of such bifurcated poles only of each yoke, and a rotor cooperating with the free ends of said poles operating at one speed when said yokes are magnetized in one of said manners and operating at another speed when said yokes are magnetized in another manner.

3. In a two-speed motor, the combination with a plurality of yokes of magnetic material each having two poles and so located with respect to each other as to constitute radially disposed poles substantially equally spaced, means for magnetizing said yokes by alternating magnetic flux in a manner to produce magnetic poles of unlike polarity in adjacent poles in each yoke and to produce magnetic poles of either like or unlike polarity in adjacent poles of different yokes one pole only of each of said yokes being bifurcated, a shading coil on the inwardly located bifurcation only of such bifurcated poles with respect to their yokes, and a rotor cooperating with the free ends of said poles operating at one synchronous speed when said yokes are magnetized in one of said manners and operating at another synchronous speed when said yokes are magnetized in another manner.

4. In a two-speed motor, the combination with a plurality of yokes of magnetic material each having two poles and so located with respect to each other as to constitute poles substantially equally spaced in relation to a circle, means for magnetizing said yokes by alternating magnetic flux in a manner to produce magnetic poles of unlike polarity in adjacent poles in each yoke and to produce magnetic poles of either like or unlike polarity in adjacent poles of different yokes, means for causing part of the flux in some poles to lag behind the rest of the flux in such poles, and a rotor cooperating with the free ends of said poles constructed to have one set of preferential magnetic paths to form a number of poles equal to the number of yokes and to have another set of preferential magnetic paths to form a number of poles equal to twice the total number of yokes.

5. In a two-speed motor, the combination with a plurality of yokes of magnetic material each having two poles and so located with respect to each other as to constitute poles substantially equally spaced, means for magnetizing said yokes by alternating magnetic flux in a manner to produce magnetic poles of unlike polarity in adjacent poles in each yoke and to produce magnetic poles of either like or unlike polarity in adjacent poles of different yokes, means for causing part of the flux in some poles to lag behind the rest of the flux in such poles to result in a rotating magnetic field, and a rotor having a preferential magnetic path to constitute a multi-pole magnetic structure and having its periphery slotted to constitute a multi-multi-pole magnetic structure associated with said yokes.

6. In a two-speed motor, the combination with a core of magnetic material having a plurality of poles and so located with respect to each other as to constitute poles substantially equally spaced, means for magnetizing said poles by alternating magnetic flux in a manner to produce magnetic poles of unlike polarity in adjacent poles in the core or to produce magnetic poles such that the poles of successive pairs are of like polarity but adjacent pairs of poles are of unlike polarity, means for causing part of the flux in some poles to lag behind the rest of the flux in such poles to result in a rotating magnetic field, and a rotor having a preferential magnetic path to constitute a multi-pole magnetic structure and having its periphery slotted to constitute a multi-pair-pole magnetic structure.

7. In a two-speed synchronous motor; the combination with a core of magnetic material; windings for producing, when energized by alternating current in one of two different manners, an alternating magnetic field of either a predetermined number of poles or a multiple of such predetermined number of poles; means for causing part of the magnetic flux in some of the poles to lag behind the rest of the flux in such poles to produce a rotating magnetic field; and a rotor having two sets of preferential magnetic paths one set of which is constructed to be capable of locking in with a rotating magnetic field of said predetermined number of poles and the other set of which is constructed to be capable of locking in with a rotating magnetic field of said multiple of such predetermined number of poles.

8. A two-speed synchronous motor of the type described comprising; a stator including a laminated structure, windings and shading coils for said laminated structure, the windings of said stator being included in two circuits and the laminated structure and shading coils being so interrelated that if one of said circuits is energized by alternating current a rotating magnetic field of a predetermined number of pairs of poles will result and if the other of said circuits is energized by such alternating current a multiple of such predetermined number of rotating pairs of magnetic poles will result; and a rotor for said stator comprising a disk of the ferrous induction type and a shaft for perpendicularly supporting said disk for rotation, said disk being perforated to form an even number of spokes to establish preferential magnetic paths to constitute a predetermined number of pairs of poles and being slotted peripherially to establish preferential magnetic paths to constitute a multiple of such pairs of poles.

OSCAR H. DICKE.